United States Patent [19]
Santos

[11] 4,043,126
[45] Aug. 23, 1977

[54] TURBINE ENGINE FOR AUTOMOTIVE VEHICLES

[76] Inventor: Jaime Rios Santos, Calle Jose H. Aldrey, 1442, Santiago Iglesias, Rio Piedras, P.R. 00921

[21] Appl. No.: 700,810

[22] Filed: June 29, 1976

[51] Int. Cl.² .............................................. F15B 13/07
[52] U.S. Cl. ........................................ 60/407; 60/412; 137/625.11; 180/66 B
[58] Field of Search ................. 60/407, 412, 416, 425, 60/483, 493; 137/625.11; 180/66 B

[56] References Cited
U.S. PATENT DOCUMENTS

| 859,235 | 7/1907 | MacFarren | 60/412 X |
|---|---|---|---|
| 900,342 | 10/1908 | Ashley | 60/425 X |
| 2,966,776 | 1/1961 | Taga | 60/412 X |
| 3,563,032 | 2/1971 | LaPointe | 60/412 X |
| 3,958,419 | 5/1976 | Laing | 60/425 X |

FOREIGN PATENT DOCUMENTS 13,936 of 1913 United Kingdom ................... 60/407

Primary Examiner—Edgar W. Geoghegan
Attorney, Agent, or Firm—Scrivener, Parker, Scrivener and Clarke

[57] ABSTRACT

An engine for driving an automotive vehicle has a plurality of turbine rotors mounted on the main drive shaft. Compressed air is supplied to the rotors in succession from a distributing valve which is supplied with compressed air from a main air tank, and compressed air at reduced pressure from the delivery side of each rotor is supplied to a manifold which also supplies the main air tank through a second stage compressor.

2 Claims, 4 Drawing Figures

TURBINE ENGINE FOR AUTOMOTIVE VEHICLES

BACKGROUND OF THE INVENTION

The present day interest in environmental quality, and the statutes requiring reduction in air pollution, make it necessary to provide a means for driving automotive vehicles which can take the place of the internal combustion engine. One possible source of motive power is compressed air and it has been proposed, and is now disclosed in United States Letters Patent, that compressed air be utilized to drive automobile engines. However, most of these proposals have envisioned reciprocating piston engines and these have not been found to be satisfactory for a variety of reasons, the most important of which is the inertia of the moving parts of such engines, which is very great and requires such a high starting torque that such engines have not been successful. Proposals have also been made to utilize the turbine principle for the propulsion of automobile vehicles but these have not been successful for a variety of reasons.

It has therefore been the object of this invention to provide a turbine engine powered by compressed air which will be satisfactory and useful for the propulsion of automobiles and other automotive vehicles.

SUMMARY OF THE INVENTION

The turbine rotors of an automobile engine are mounted on a common main drive shaft and are sequentially supplied with compressed air by a distributor which is itself supplied from a main compressed air tank which, in turn, is supplied by a shaft-driven compressor to which second stage compressed air is delivered from the output sides of the rotors through a manifold.

DESCRIPTION OF THE INVENTION

The turbine engine provided by the invention consists in a suitably mounted rotatable drive shaft 2 which is connected through conventional gearing A to the drive wheels B of an automobile. A plurality of turbine rotors 6 are mounted on the shaft in suitably spaced relation and the entire assembly of shaft and rotors is mounted in an engine block or casing which is conventional and is therefore not illustrated. A fly-wheel 8 is also mounted on the shaft and has its usual function.

Figure 1:
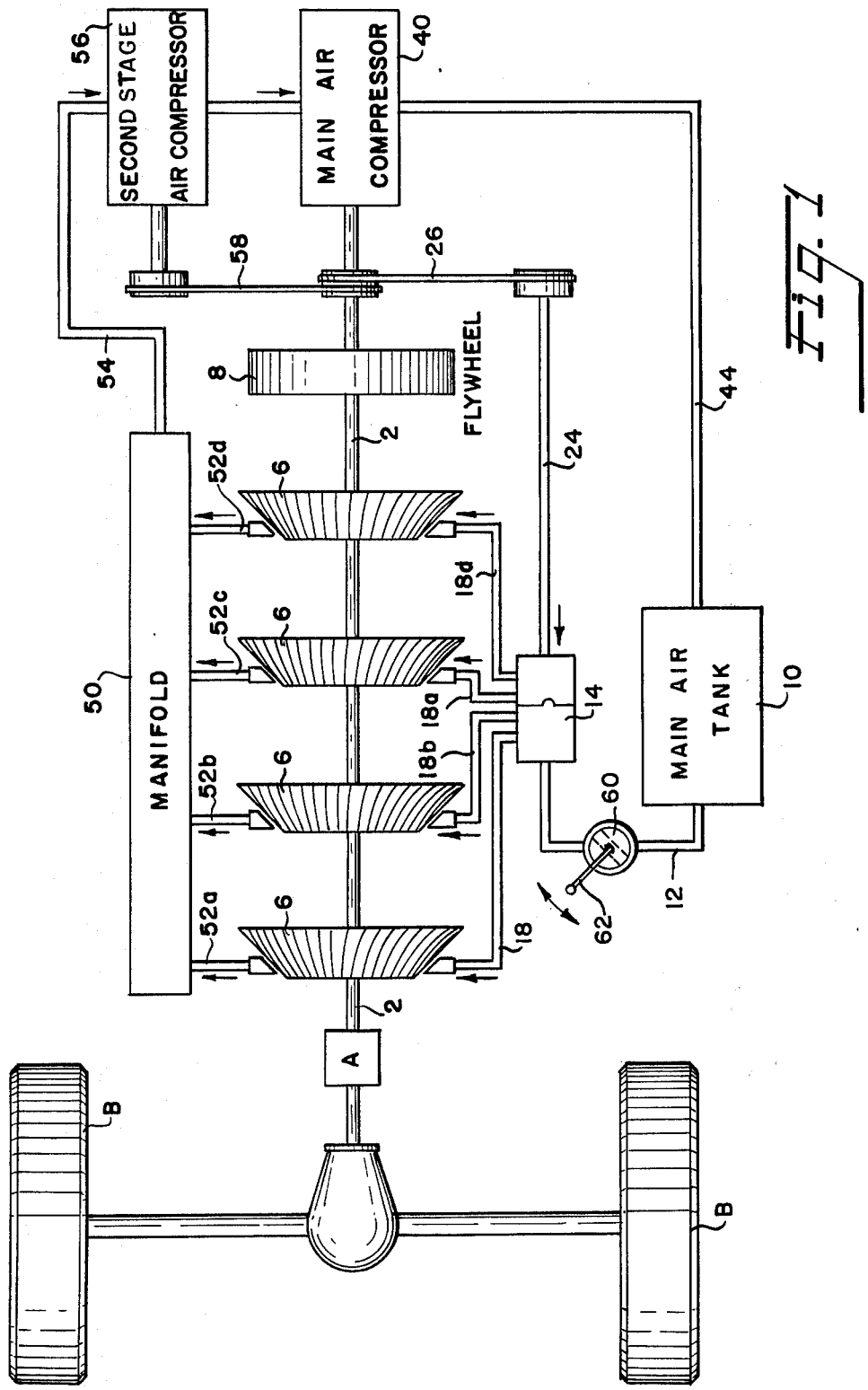
FIG. 1 is a diagramatic view of the turbine engine system according to the invention.
Figure 2:
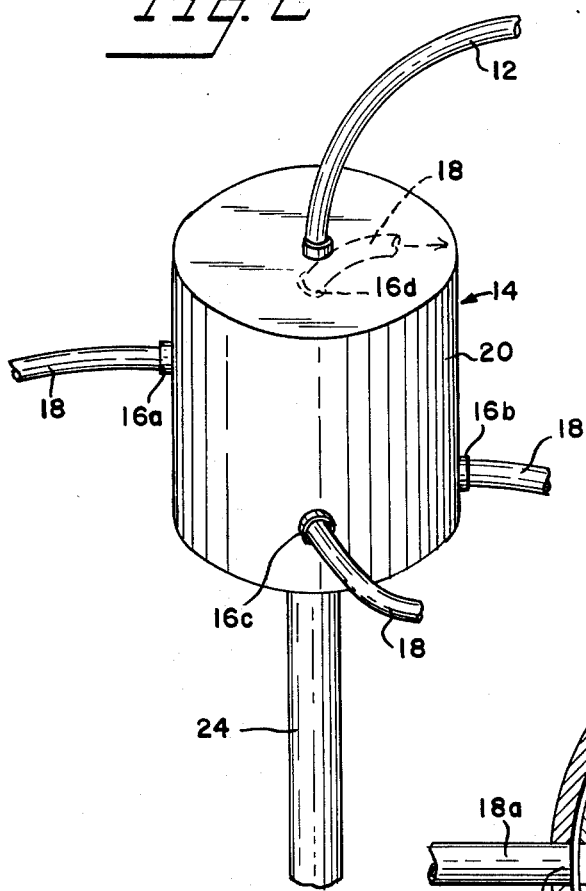
FIG. 2 is a perspective view of the distributor which forms part of the engine.
Figure 4:
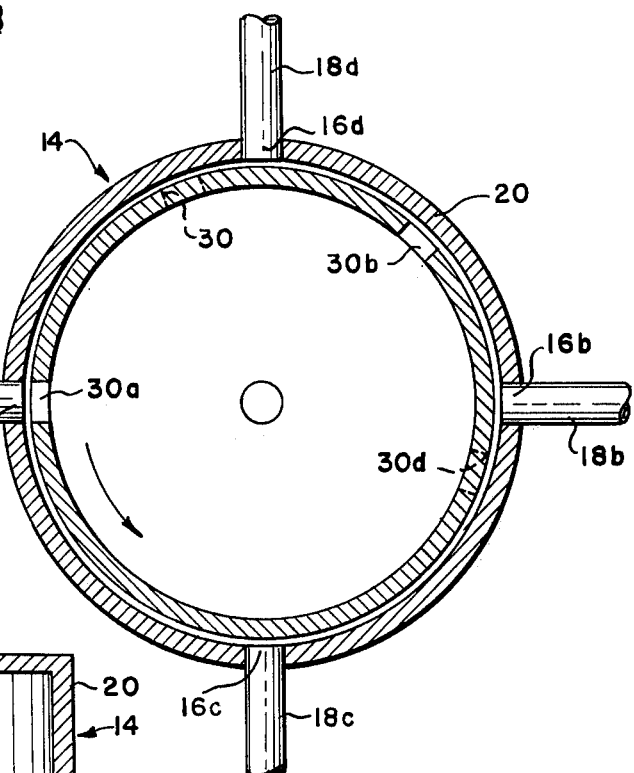
FIG. 4 is a sectional view taken on line 4—4 of FIG. 3.
Figure 3:
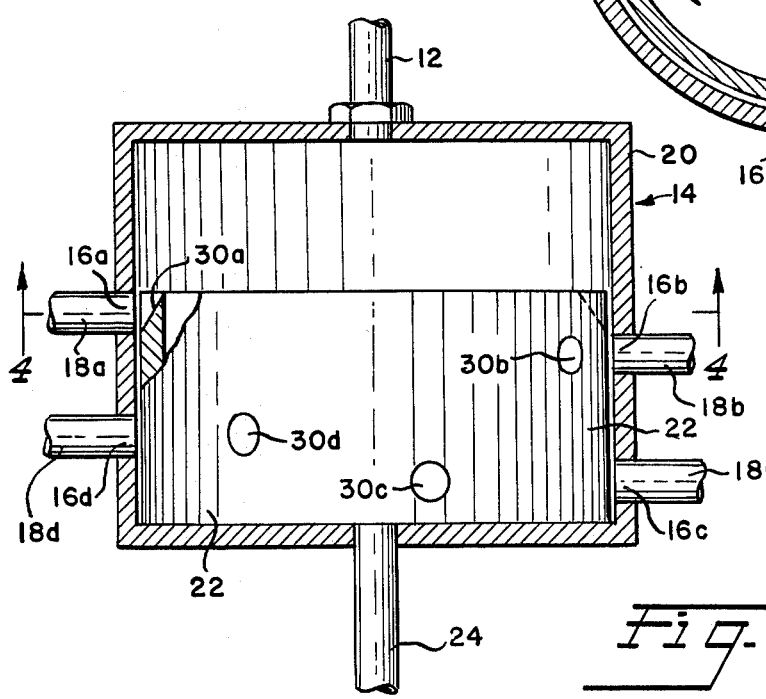
FIG. 3 is a diametrical sectional view of the distributor.

Means are provided by the invention for sequentially supplying compressed air to the rotors, and such means comprise a main air tank 10 which forms a reservoir of air under suitable high compression, and which supplies compressed air through pipe 12 to the inlet port of a distributor 14 which is shown in detail in FIGS. 2, 3 and 4. This distributor is provided with outlet ports 16a, 16b, 16c, 16d in the same number as the rotors, and the outlet ports are connected through tubing 18a, 18b, 18c, 18d to the drive side of the rotors, there being four rotors in the disclosed embodiment of the invention and therefore four outlet ports in the distributor and four pipe connections from the distributor to the rotors.

The distributor comprises a fixed cylindrical casing 20 to which the compressed air is supplied through pipe 12 from the main air tank, and in the disclosed embodiment the peripheral wall of the casing is provided with the four outlet ports 16a, 16b, 16c, 16d each of which is connected to the input or drive side of one of the turbine rotors through one of the pipes 18. Within the casing there is provided a cup shaped cylindrical rotatable valve member 22 which is mounted on the end of a shaft 24 is rotated by drive connection 26 from the main drive shaft 2. The cup shaped rotatable valve member is open to the interior of casing 20 and therefore is constantly filled with compressed air, and its wall is provided with openings 30a, 30b, 30c, 30d which sequentially register with the outlet ports 16 in the fixed casing member.

In order to provide the sequential supply of compressed air to the shaft rotors the casing ports 16a, 16b, 16c and 16d are positioned at progressively spaced positions axially of the casing 20, and each of the ports 30a, 30b, 30c, 30d in the rotatable valve member 22 is positioned at the same axial level as the correspondingly lettered outlet ports in the casing and are spaced circumferentially of the valve member, in the present case by 90° spacing, because there are four rotors 6.

Means are provided by the invention for supplying compressed air from two sources. The first of these is a main air compressor 40 which is of the rotary type and is driven by direct connection to the main drive shaft and which delivers compressed air directly to the main air storage tank 10 through piping 44. The second source of compressed air is a manifold 50 which is connected by piping 52a, 52b, 52c, 52d to the output side of each of the turbine rotors 6 so that the manifold is sequentially supplied with compressed air at the reduced pressure at the output side of the turbine rotors, whereby a constant air pressure is maintained in the manifold which, in turn, is connected by piping 54 to a second stage rotary air compressor 56 which is driven from the drive shaft 2 through drive connection 58.

A valve 60 is provided in the piping connection 12 between the main air tank 10 and distributor 14, and may be operated by means such as the usual accelerator pedal 62 of the automobile for starting the engine and for regulating the supply of compressed air to the distributor, and therefor to the turbine rotors, thereby to regulate the speed of rotation of the drive shaft.

I claim:

1. A turbine engine for an automotive vehicle, comprising a rotatable drive shaft, a plurality of turbine rotors mounted on the shaft, a main compressed air tank, a compressor driven by the drive shaft and connected to supply compressed air to the main air tank, a distributor valve, means for supplying compressed air from the main tank to the distributor valve, connections for transmitting compressed air from the distributor valve to the drive side of each rotor, means operated by the drive shaft for continuously operating the distributor valve to cause compressed air to flow to the rotors in sequence, a manifold, connections between the delivery side of each rotor and the manifold, and a connection for supplying second stage compressed air from the manifold to the main air compressor.

2. A turbine engine according to claim 1, in which the distributor valve comprises a closed cylindrical casing the interior of which is open to the main air tank, a plurality of outlet ports in the casing the number of which is equal to that of the rotors and which are spaced axially of the casing, a rotatable cup shaped valve within the casing which is open to the interior of the casing and is connected to be rotated by the drive shaft, the valve cup shaped having a plurality of openings in its wall equal in number to that of the outlet ports in the casing, each of the outlet ports in the casing corresponding in axial position to only one of the openings in the wall of the cup shaped valve member and the ports and openings being spaced circumferentially of the casing and the cup shaped valve member, whereby the ports in the casing are sequentially supplied with compressed air from the interior of the casing.

* * * * *